Nov. 2, 1943.   E. C. ROGERS   2,333,583
ENLARGER
Filed Sept. 20, 1941
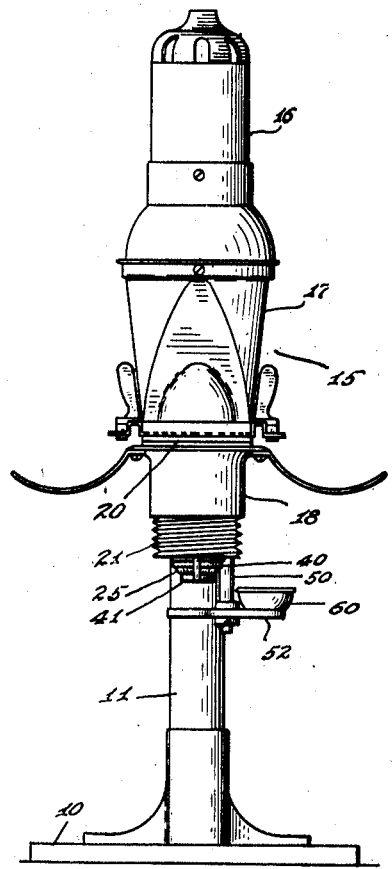
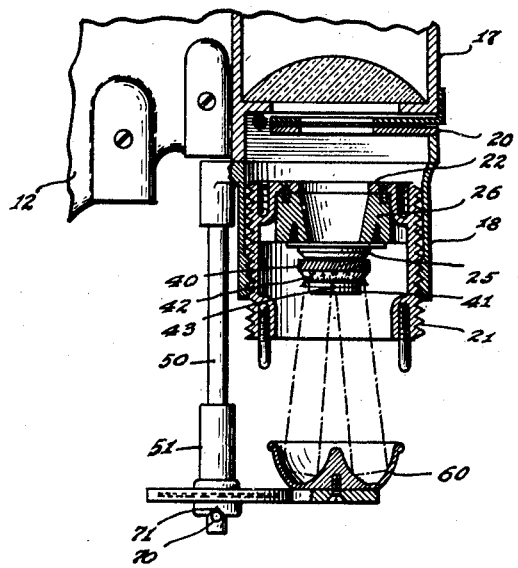
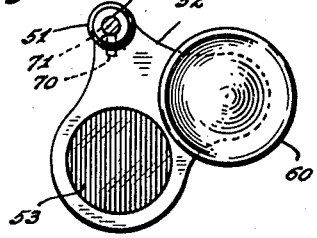
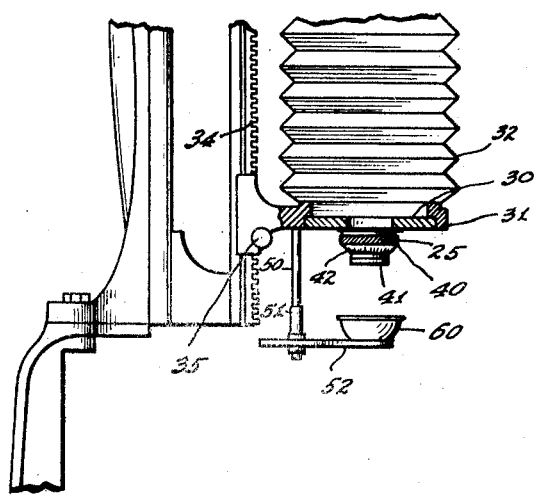
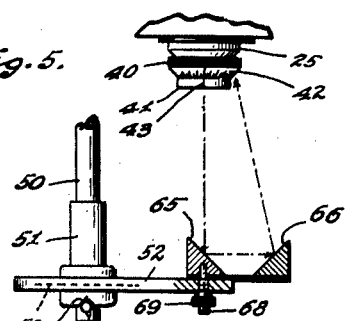
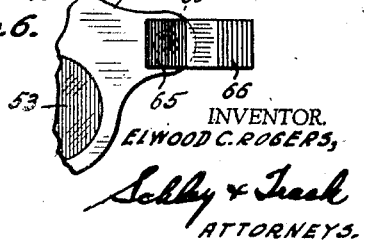
INVENTOR.
ELWOOD C. ROGERS,
BY
Schley & Treek
ATTORNEYS.

Patented Nov. 2, 1943

2,333,583

UNITED STATES PATENT OFFICE 2,333,583

ENLARGER

Elwood C. Rogers, Indianapolis, Ind.

Application September 20, 1941, Serial No. 411,639

13 Claims. (Cl. 88—24)

This invention relates to photographic enlargers, and particularly to an improvement in a photographic enlarger which facilitates its adjustment and operation.

A photographic enlarger has a light system which includes a lens, and that lens is adjustable for focus and is usually provided with an adjustable diaphragm to vary the size of the aperture. The focus adjustment permits the picture being enlarged to be brought into focus in the plane of the sensitized paper or other material upon which the print is to be made. The sensitized material is usually held in that plane by being received on a movable support and held thereon by a border frame, and that border frame and the support, designated collectively as a "printing frame," are movable to aline the sensitized material within the border frame with that portion of the picture which it is desired to print. The diaphragm adjustment varies the size of aperture of the lens and controls the amount of light which passes through the lens, so that that amount of light can be made to suit conditions, such as the characteristics of the photographic negative being used, the desired length of exposure, and the characteristics of the sensitized material upon which the print is being made.

It is the object of my invention to improve a photographic enlarger to facilitate these various adjustments.

The accompanying drawing illustrates my invention. In such drawing: Fig. 1 is a front elevation of a photographic enlarger; Fig. 2 is a fragmental side elevation of the enlarger shown in Fig. 1, with parts of such enlarger being shown in section, and illustrating a modified arrangement of the lens of such enlarger; Fig. 3 is a plan of a swinging arm which carries a light-reducing screen and a light-reflector; Fig. 4 is a fragmental side elevation of a modified form of enlarger, in which the focus adjustment is obtained by movement of the lens carrier along a rack; Fig. 5 is an elevation of a modified form of swinging arm, with parts shown in section to show the details of the modified light-reflector which such arm carries; and Fig. 6 is a plan of the light reflector shown in Fig. 5.

The enlarger has a base plate 10 for supporting the sensitized material, either directly on the upper surface of such base plate 10 or desirably by means of a printing-frame equipped with a border frame. An upright 11 rises from one end of the base plate 10 to an arm 12 which is vertically adjustable on that upright 11 and is clampable in any desired position thereon and which supports the enlarger housing 15. The enlarger housing 15 includes a lamp housing 16 at its upper end, an intermediate shell 17, and a depending barrel 18. Between the shell 17 and the barrel 18 there is a slot for the reception of a negative holder 20. The barrel 18 is provided with internal screw threads which mate with the threads of a lens-carrying sleeve 21 received within that barrel 18 and adjustable toward or away from the negative holder 20 by rotation within such barrel 18. The sleeve 21 is provided at one end with an inwardly directed flange 22, and that sleeve 21 may be received in the barrel 18 either with the flanged-end up, as in Fig. 2, or with the flanged-end down, as in Fig. 1. The flange 22 provides a mounting for the objective lens 25, and that lens may be mounted either on the outer surface of the flange 22, as in Fig. 1, or may be mounted on the inner surface of the flange, as on a mounting block 26 as is shown in Fig. 2, or directly on such flange.

The type of enlarger shown in Figs. 1 and 2 and so far described is the type shown in Patent No. 2,256,651, issued on my co-pending application, Serial No. 277,886, filed June 7, 1939, of which application the present application is a continuation-in-part.

In Fig. 4 I have shown a fragmental portion of a modified form of enlarger, such as that shown in my Patent No. 1,633,228, issued June 21, 1927. In this enlarger of Fig. 4, the lens 25 is mounted on a lens board 30 carried in a frame 31 at the lower end of the bellows 32 which connects such frame 31 with the housing for the negative carrier. The frame 31 is supported on a vertically extending rack 34 and is adjustable therealong, as by means of the handle 35, to raise or lower the lens 25 to bring it into proper focus.

The lenses of these two enlargers, as usual in photographic enlargers, is provided with an adjustable diaphragm, to vary the aperture of such lens. Such diaphragm is adjustable by means of a collar 40 mounted on the sleeve 41 which encloses the lens elements. Adjustment of the diaphragm is obtained by rotation of the collar 40 about the sleeve 41, and the position of adjustment is indicated by the position of the scale 42 on the lower beveled surface of the collar 40 with respect to a mark 43 upon the sleeve 41.

As has heretofore been indicated, after the enlarger has been adjusted to bring the lens 25 to the proper position to focus the picture in the plane of the sensitized material on which the enlargement is to be made, it is necessary to aline such sensitized material, and its border frame if a border frame is used, with that portion of the picture of which an enlargement is desired.

I provide the enlarger with a depending stem 50 which extends downwardly from the enlarger parallel with the axis of the lens 25 and spaced a short distance from that axis. On such stem 50 I mount a rotatable collar 51 from which there extends an arm 52. The arm 52 is formed to provide an opening in which is mounted a light-reducing screen 53, desirably of such character as to make the light passing through it substantially non-actinic, to permit alinement of the sensitized material. The stem 50 must extend, and the light-reducing screen 53 must be positioned, but a short distance below the lens 25, for the lens must be free to move to within a short distance of the base plate or the holder on which the sensitized material is mounted, and the screen 53 must be close enough to the lens so that the whole beam of light passing through such lens will also pass through the screen 53.

In order to illuminate the scale 42 on the diaphragm-adjusting collar 40, I also provide on the swinging arm 52 a light-reflector which is adapted to receive light from the lens and to reflect such light back on to such scale 42. Although in some instances a flat reflecting surface on such arm 52 will be satisfactory, I prefer to use a reflector 60 shaped as shown in Figs. 2 and 3. This reflector 60 has a reflecting surface in the shape of a ring-groove, and is adapted to be positioned coaxial with the lens. The cross-sectional shape of the groove is such that the light from the lens strikes the surface of the inner wall of the ring-groove and is reflected by such surface outwardly away from the axis of the lens and of the ring-groove, and then strikes the surface of the outer wall of the ring groove and is reflected upwardly to the scale 42 of the diaphragm adjusting collar 40. This cross-sectional shape is parabolic in character, but it may not be a true parabola; and in any case the reflector need not be made with mathematical accuracy. The reflecting surface may be slightly or highly polished, or it may be simply a painted surface.

This form of reflector 60 throws light on the whole circumference of the beveled end of the collar 40, so that it lights the scale 42 regardless of the circumferential position of such scale. This form of reflector 60 is therefore of universal adaptability, and is especially suitable for use in combination with an enlarger in which focus adjustment of the lens is accomplished by rotation of the lens about its axis, as is the case in the enlarger of Figs. 1 and 2.

In enlargers in which the lens is carried on a mounting which may be moved vertically without rotation, as in the enlarger of Fig. 4, the modified reflector of Fig. 5 may be used. In this case, the reflector comprises an inclined reflecting surface 65 adapted to be positioned to be cut by the axis of the lens 25, so that the light rays from such lens will strike that inclined surface and will be reflected outwardly by that surface. A second inclined-reflecting surface 66 receives the rays of light reflected from the surface 65 and reflects them upwardly to the diaphragm adjusting collar 40. This latter arrangement will throw light on only a portion of the circumference of such collar 40. To permit the light to be reflected to that portion of the collar 40 which carries the scale 42, the two reflecting surfaces 65 and 66 are mounted upon a carrying plate 67, which in turn is rotatably mounted on the arm 52, as by means of a rod 68 threaded to receive a knurled nut 69 by which the plate 67 may be clamped in any desired position of adjustment. The rod 68 should lie substantially on the axis of the lens 25 so that the surface 65 will receive light from such lens regardless of the position of adjustment of the plate 67.

The collar 51 and the arm 52 carried by it may be swung about the stem 50 to any of several positions of adjustment. In one such position, the light-reducing screen is aligned with the lens 25. In another position of adjustment, the reflector 60, or the surface 65, will be aligned with the lens 25; and in a third position of adjustment the arm 52 and the parts it carries will be completely out of the path of light through the lens 25. To this end, the collar 51 rests on a pin 70 projecting from the lower end of the stem 50, and the collar is provided with a series of notches 71 each of which co-operates with the pin 70 in one of the positions of adjustment of the arm 52.

In both modifications of the reflectors shown in Figs. 2 and 5 respectively, the light received from the beam which passes through the lens 25 is first reflected outwardly and then upwardly, so that the light reflected upwardly is displaced far enough away from the axis of the lens 25 that it may fall directly upon the scale 42 and give good illumination not only to that scale 42 but as well to the mark 43 on the outer cylindrical surface of the sleeve 41.

I claim as my invention:

1. In a photographic enlarger, the combination of a light source, a lens mechanism, said lens mechanism being provided with a diaphragm and a circumferentially movable diaphragm-adjusting device, and a swinging arm which is provided with a light-reducing screen and a light-reflecting surface either of which may be swung into the line of the lens axis, the light-reflecting surface being arranged to reflect light back upon the diaphragm-adjusting device of the lens.

2. In a photographic enlarger, the combination of a light source, a lens mechanism, said lens mechanism being provided with a diaphragm and a circumferentially movable diaphragm-adjusting device, and a swinging arm which is provided with a light-reducing screen and a light reflector either of which may be swung into the line of the lens axis, the light reflector being arranged to reflect light back upon the diaphragm-adjusting device of the lens.

3. In a photographic enlarger, the combination of a light source, a lens mechanism, said lens mechanism being provided with a diaphragm and a circumferentially movable diaphragm-adjusting device, and a swinging arm which is provided with a light reflector which may be swung into the line of the lens axis, the light reflector being arranged to reflect light back upon the diaphragm-adjusting device of the lens.

4. In a photographic enlarger, the combination of a light source, a lens mechanism, said lens mechanism being provided with a diaphragm and a circumferentially movable diaphragm-adjusting device, and a swinging arm which is provided with a light reflector and a light reducing screen either of which may be swung into the line of the lens axis, the light reflector being arranged to reflect light back upon the diaphragm-adjusting device of the lens, said arm being provided with positioning means for positioning either the light-reducing screen or the light-reflecting surface in the light path and for positioning both out of the light path.

5. In a photographic enlarger, the combination of a light source, a lens mechanism, said lens mechanism being provided with a diaphragm and a circumferentially movable diaphragm-adjusting device, and a swinging arm which is provided with a light reflector which may be swung into the line of the lens axis, the light reflector being arranged to reflect light back upon the diaphragm-adjusting device of the lens, said arm being provided with positioning means for positioning the light-reflecting surface in and out of the light path.

6. In a photographic enlarger, the combination of a light source, a lens mechanism, said lens mechanism being provided with an adjustable diaphragm and an adjustment scale therefor, a light-reflector and a light reducing screen either of which may be moved into and out of the line of the lens axis, said light reflector being arranged to reflect light upon the adjustment scale of said adjustable diaphragm.

7. In a photographic enlarger, the combination of a light source, a lens mechanism, said lens mechanism being provided with an adjustable diaphragm and an adjustment scale therefor, a light-reflector which may be moved into and out of the line of the lens axis, said light reflector being arranged to reflect light upon the adjustment scale of said adjustable diaphragm.

8. The combination of claim 7 in which the light reflector is in the shape of a ring groove.

9. The combination of claim 7 in which the light reflector is in the shape of a ring groove the cross sectional shape of which is parabolic.

10. The combination of claim 7 in which the light reflector is in the shape of a ring groove and is arranged to receive light from the lens on its inner wall, to reflect such light outwardly to its outer wall and thence back to the adjustment scale of said adjustable diaphragm.

11. In a photographic enlarger, the combination of a light source, a lens mechanism, said lens mechanism being provided with an adjustable diaphragm and an adjustment scale therefor, a light-reflector which may be moved into and out of the line of the lens axis, said light-reflector having a light reflecting surface arranged to receive light from the lens and reflect it outwardly from the lens axis, and a light reflecting surface arranged to receive such reflected light and reflect it on to the adjustment scale of said adjustable diaphragm.

12. In a photographic enlarger the combination of a light source, a lens mechanism, a negative holder positioned between said light source and said lens mechanism, said light source being arranged to project light through a negative in said holder and thence through said lens mechanism, an adjusting mechanism on said enlarger, and a light-reflector movable into and out of the path of light beyond said lens and arranged to reflect light toward said adjusting mechanism to illuminate it.

13. In a photographic enlarger the combination of a light source, a lens mechanism through which light from said source passes, an adjusting mechanism on said enlarger, and a swinging arm which is provided with a light-reducing screen and a light reflector either of which may be swung into the path of light from said lens, the light reflector being arranged to reflect light toward said adjusting mechanism to illuminate it.

ELWOOD C. ROGERS.